Aug. 21, 1956  J. O. EVERHART  2,759,491
COAXIAL CONDUIT CONSTRUCTION
Filed Oct. 27, 1953  2 Sheets-Sheet 1
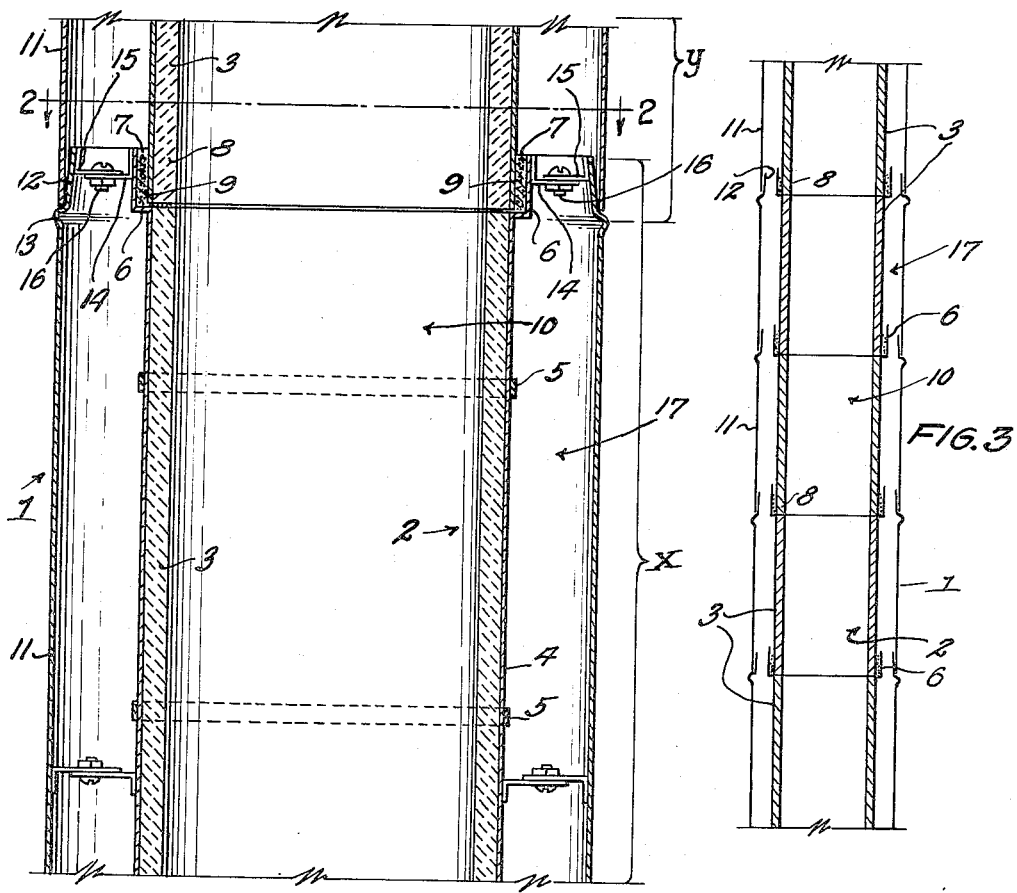
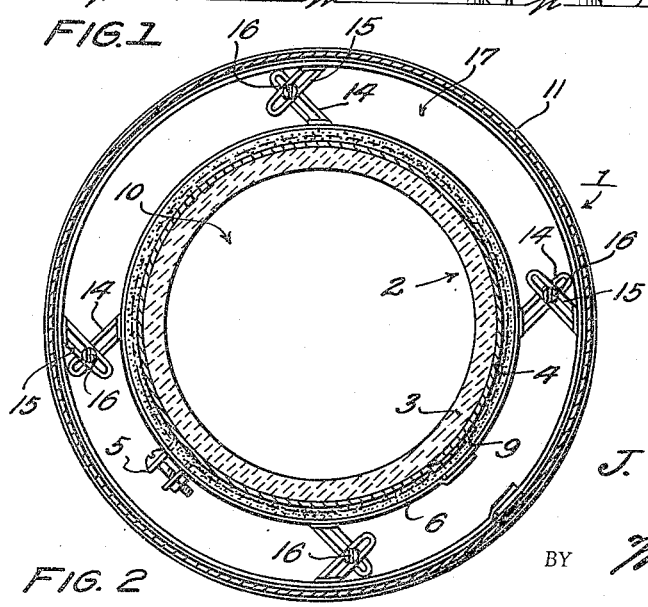
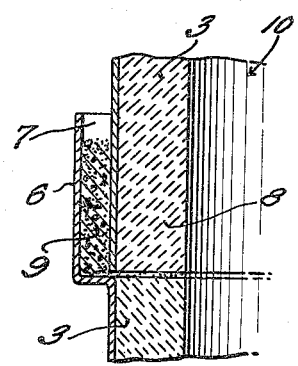
INVENTOR
J. O. Everhart
BY M. S. Rambo
ATTORNEY

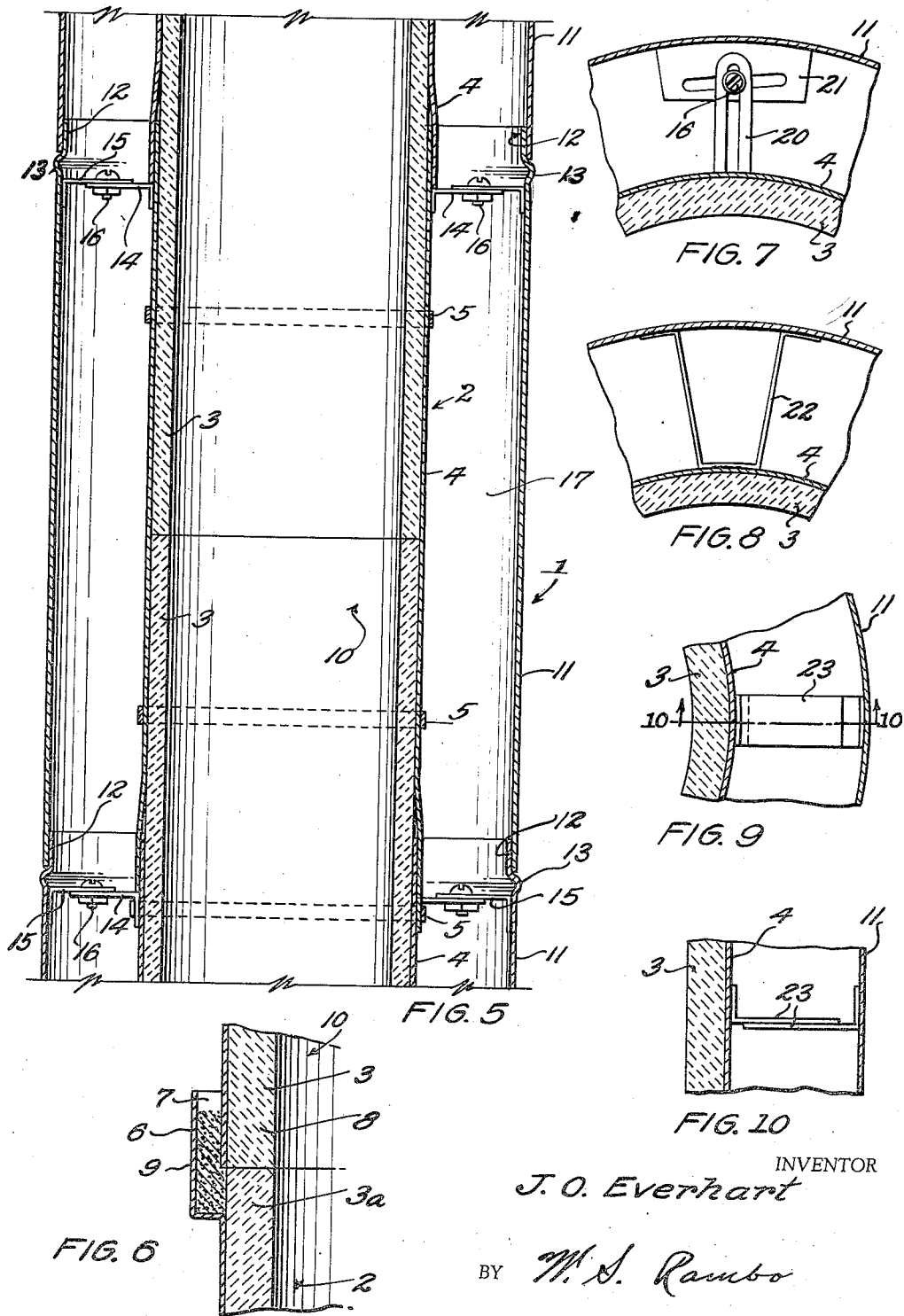

United States Patent Office 2,759,491
Patented Aug. 21, 1956

2,759,491

COAXIAL CONDUIT CONSTRUCTION

John O. Everhart, Columbus, Ohio, assignor, by mesne assignments, to National Clay Pipe Research Corporation, Logan, Ohio, a corporation of Ohio Application October 27, 1953, Serial No. 388,488

7 Claims. (Cl. 138—63)

This invention relates generally to conduit construction, and has particular reference to an improved conduit construction in which a plurality of tubular conduits are arranged relatively in concentric coaxial relationship, whereby to provide a plurality of passageways adapted for the separate transmission of fluids through the assembly in an unmixed state.

More specifically considered, the present invention is concerned with coaxial conduit construction adapted, particularly for use in the formation of chimneys, flues and combustion products outlets employed in conducting heated gases, in a safe and confined manner, from positions of origination within houses or buildings to controlled exterior positions of atmospheric discharge.

In the past, various forms and types of so-called "prefabricated chimneys" have been proposed wherein coaxial, relatively spaced, inner and outer conduit sections are joined together in relatively short lengths to form unitary conduit sections, provision being made in the construction thereof for the passage of combustion products through the inner section and the passage of cooling atmospheric air through the space provided between the inner and outer sections of the conduit. However, in previous prefabricated chimney constructions, of which I am aware, either both the inner and outer conduit members have been formed of metal, or one, usually the outer, conduit member has been formed of metal and the other or inner conduit member of ceramic material. Both of the above outlined constructions are subject to certain objection; for example, where metal is used as the inner conduit section and exposed to gaseous products of combustion, the same is subject to the normally corrosive effects of combustion gases and deterioration as a result of exposure to relatively high temperatures.

In constructions providing an inner conduit member of ceramic composition, it will be realized that such ceramic compositions are normally of a relatively frangible nature and susceptible to fracture or rupture due both to physical and thermal shock, and in the event of such fracture or rupture, gaseous products of combustion are permitted to escape from the confines of the ceramic conduit outwardly into the space defined between the inner and outer conduit members of the chimney construction, thus creating a hazardous condition.

It is, therefore, a primary object of the present invention to provide an improved prefabricated, coaxial conduit type of chimney construction which comprises a plurality of separate preformed, coaxial conduit sections, each comprising an outer wall-forming casing of sheet metal formation, an inner flue liner of ceramic composition disposed in inwardly spaced concentric relation within the outer casing, and having positioned about the outer surface thereof an inner sheet metal jacket which functions both to provide a convenient means for supporting ceramic flue liner and connecting the liner to the outer wall casing, and also as a means to prevent the dangerous escape of flue gases should fracture or rupture, or other failure, of the ceramic flue liner take place.

It is a particular object of this invention to provide in conduit construction of the character indicated a plurality of inner and outer conduit-forming sections disposed in relatively spaced, longitudinally extending, coaxial order, and wherein improved means are provided for maintaining the spaced concentricity of said sections and causing the same to provide separate inner and outer, longitudinally extending, fluid-conducting passageways.

A further object of the invention is to provide in coaxial conduit construction an outer casing composed of a plurality of sheet metal sections, wherein each of the sections is formed at one end thereof with an annular bead constituting a seat for regulating the extent of telescoping interfitting movement of the end portions of an adjoining section of said casing.

Still a further object of the invention is to provide in conduit construction of the character set forth an inner metallic tubing composed of a plurality of sections forming an inner passageway, the said tubing sections being disposed within those of an outer casing to define between said tubing and outer casing an annular outer passageway which is spaced from said inner passageway throughout its length, the inner tubing being clamped rigidly to a lining composed of a plurality of longitudinally disposed ceramic sections arranged within the tubing in end to end abutting order.

Still a further object of the invention is to provide conduit construction of the character set forth which will be of simple, durable and comparatively inexpensive design and well adapted for its intended purposes.

With the above and other objects in view, the invention consists of certain novel features of construction, combinations and arrangements of parts hereinafter described and claimed.

In the accompanying drawings:

Fig. 1 is a vertical sectional view taken through a chimney-forming conduit construction made in accordance with my invention;

Fig. 2 is a horizontal sectional view taken transversely through the conduit construction on the plane indicated by the line 2—2 of Fig. 1;

Fig. 3 is a diagrammatic longitudinal sectional view taken through a number of sections of my improved conduit construction and illustrating more particularly the arrangement of the joints formed between the meeting ends of said sections;

Fig. 4 is a fragmentary sectional view on an enlarged scale disclosing the bell and spigot joint construction formed between the meeting ends of the sections of the inner tubing of my improved conduit construction;

Fig. 5 is a vertical longitudinal sectional view taken through a second or modified form of my improved coaxial conduit construction;

Fig. 6 is a detail fragmentary longitudinal sectional view showing a modified form of bell and spigot joint employed in uniting the adjacent ends of the inner tubing of my improved construction;

Fig. 7 is a fragmentary horizontal sectional view disclosing a modified type of adjustable connector employed in uniting the sections of the inner tubing of my improved conduit construction with the outer casing sections;

Fig. 8 is a similar view disclosing another modified type of connector;

Fig. 9 is a similar view of a still further modified form of connector;

Fig. 10 is a vertical sectional view on the line 10—10 of Fig. 9.

Referring to the drawings and more particularly to the form of my invention illustrated in Figs. 1 through 4 thereof, my improved coaxial conduit construction comprises an outer casing 1, generally of straight hollow cylindrical form and in which is positioned an inner concentrically disposed tubing, indicated generally at 2. Such an outer casing and an inner tubing grouped as shown form a composite conduit section, having outer end portions adapted for interfitting relation with the complemental ends of adjoining sections, and being further provided with means for maintaining the inner tubing and outer casing in spaced coaxial order.

While my improved conduit construction is adaptable for many practical uses, I find that the features thereof are particularly useful in the formation of pre-fabricated chimneys for use in conducting hot spent furnace gases, or the like, from a furnace, or other point of origination, through a wall or roof of a building to the atmosphere.

To form the inner tubing of each section in a simple and practical manner the same is constructed to include a refractory corrosion-resisting liner composed of a tubular ceramic section 3. These sections in the complete conduit are adapted to be placed one upon the other in aligned end-abutting relationship.

Surrounding each of the ceramic sections 3 is an inner metallic jacket 4. The jacket, for each of the sections 3, is rolled to approximately the outer diameter of its associated ceramic section and drawn tightly around it by, for example, the use of the clamping or fastening bands indicated at 5. Each of the jackets 4 is formed at its upper end with an enlarged bell formation 6, forming an annular space 7 in which is received, as shown more particularly in Fig. 4, the lower spigot end 8 of a next adjacent upper section. Mortar, or other cementitious material, indicated at 9, may be positioned in the space 7 upon assembly of the conduit sections, in order to make a tightly sealed joint between the interfitting adjoining ends of the inner tubing, thus insuring against the escape of hot noxious gases, or the like, from the inner passageway 10 formed by the liner 3.

The outer casing 1 comprises a plurality of outer metallic sections 11 arranged in registry and coextensive in length with the sections of the inner tubing. Each outer section 11 is rolled and formed into a cylinder provided with a crimped upper end 12, so that it has a reduced diameter for insertion into the open lower end of the outer casing of a next adjacent and superposed conduit section. An annular stop bead 13 is preferably formed on each of the sections 11 contiguous to its crimped upper end, the bead 13 serving to limit downward movement of the next adjacent upper section on a given lower section of the outer casing, as disclosed more particularly in Fig. 1.

In the form of the invention shown in Figs. 1, 2 and 5 of the drawings, the sections of the outer casing and the inner tubing are united in spaced concentric order by providing the inner metallic jacket 4 of each section with an outwardly and angularly extending slotted arm 14. The inner end of each of these arms is welded or otherwise fastened in a secure manner to its associated jacket 4. Likewise, each of the outer casing sections 11 is formed with a plurality of inwardly extending angular arms 15, similar in design to the arms 14 and fastened to the outer jacket sections by welding, or otherwise, so that the arms 15 intersect the planes of projection of the arms 14. Fastening devices such as bolts or nuts, indicated at 16, are positioned in the slots of the arms 14 and 15 to hold the latter in secured adjusted positions, the slots of said arms automatically compensating for variation in out-of-roundness of the ceramic sections 3 and other structural imperfections or variations in the members of the composite conduit. It will be observed that the individual sets of arms 14 and 15 are spaced circumferentially so that they do not materially interfere with the flow of air or other fluids through the annular outer passageway 17 formed between the inner and outer jacket sections.

In the assembly of the construction disclosed, the unit shown by the bracket X of Fig. 1 is placed in position and a suitable mortar 9 is positioned in the cavity 7 formed in the bell end of each metallic inner jacket 4, so that the lower end of the next adjacent upper section of the inner tubing enters into the space 7 and makes a tightly sealed joint construction between the section X and the section shown at Y of the composite conduit. The lower end of each outer jacket 11 slips over and around the reduced upper end 12 of a lower section and is seated on the shoulder or bead 13 thereof. The assembly is tight and structurally strong, and as many units as needed may be so assembled to form a complete chimney.

It will be understood, that in the assembly and operation of a chimney formed from the present prefabricated coaxial conduit, the flue outlet of a furnace or other heating apparatus, not shown, is connected to pass gaseous products of combustion upwardly through the inner passageway 10, while atmospheric air may be caused to pass upwardly through the annular outer passageway 17, thus cooling the outer casing and the outer surfaces of the inner tubing and keeping the construction at a safe operating temperature. However, if desired, the annular outer passageway 17 may be closed at its ends to provide a thermal insulating dead air space between the outer casing and the inner tubing sections.

The ceramic liner section 3 provides a refractory and corrosion-resisting construction. The metallic jacket 4 surrounding each of the ceramic sections 3 provides a support for the ceramic sections and additionally resists leakage in the event the ceramic sections should crack or break locally. Because of these features, the prefabricated chimney is economical, safe and easy to construct and assemble.

The construction is, of course, susceptible to various modifications without departing from its essential features. For example, as shown in Fig. 5, the bell formation 6 on the jacket 4 may be eliminated, and the adjoining ends of the jacket 4 merely overlapped or telescoped in effecting their relative union. It will also be noted in Fig. 5 that the joints between the meeting ends of the ceramic liner sections 3 are disposed approximately midway in the length of each of the jackets 4, thus offsetting the joints formed by the abutting ends of the ceramic sections 3 from the joints produced between the interfitting ends of the metallic jackets 4, and also those of the outer metallic jackets 11 of the outer casing.

In Fig. 6, a modified bell and spigot joint construction is shown which differs from that disclosed in Fig. 4, in that the lower ceramic section, shown at 3a, terminates above the bottom of the space or cavity 7, instead of in registry with said bottom.

In Figs. 7, 8, 9, and 10, modified types of fasteners are shown for use in uniting the outer casing sections with the inner jacket sections. Thus, in Fig. 7 the slotted arm shown at 20 projects rigidly outwardly from the inner jacket 4 and extends over a bracket or lug 21 rigidly fastened to the outer jacket section 11. The arm 20 is formed with a radial slot while the lug 21 is formed with a transversely disposed slot. These slots receive a fastening bolt 16.

In Fig. 8 a similar arrangement is set forth in which a stirrup-type fastener 22 is employed in uniting the inner and outer jacket sections. By spreading or bowing the legs of the fastener 22 at the time of conduit assembly, variations may be made in the relative positions of said jacket sections. In Figs. 9 and 10, the inner and outer jacket sections are provided with overlapping radially disposed lugs 23, which are adapted to be welded at their ends to said jacket sections and intermediately of their length to each other, producing a rigid union between the inner and outer sections, but one which is adjustable at the time of fabricating the section.

The construction, use and advantages of the invention will be readily understood from the foregoing description taken in connection with the accompanying drawings. By providing a ceramic inner liner within the metallic casing members, such members will be effectively protected from the corrosive effects of combustion gases and excessive heat. Also, fireproof joints are provided between the sections of the chimney by reason of the overlapping or telescoping arrangements provided between the metallic sections and the inner ceramic sections and the manner in which these parts are joined together. These chimney sections can be produced at a comparatively small cost and kept in stock so that they may be quickly erected by relatively unskilled workmen. The sections are exceedingly strong and durable and will stand years of use without attention or repairs.

Various changes in the form, proportion and minor details of construction may be resorted to without departing from the principles or sacrificing any of the advantages of the invention, as indicated by the appended claims.

I claim:

1. Conduit construction comprising an inner tubing consisting of a plurality of longitudinally aligned ceramic sections disposed in end abutting relationship and defining an internal passageway for the conduction of a first fluid medium; a sectional metallic jacket surrounding the outer walls of said ceramic sections and overlapping the abutting ends thereof; clamping means for securing said jacket to said ceramic sections; an outer casing composed of a plurality of tubular metallic sections having interfitting ends, said casing being disposed in spaced concentric relation to said jacket; and spacing and connecting members uniting said metallic jacket with the sections of said outer casing to maintain the latter in spaced concentric relation to the inner tubing, said connecting members serving to space the outer casing from said inner tubing to define an outer passageway for the conduction of a second fluid medium through said conduit construction.

2. Conduit construction as defined in claim 1, and wherein said connecting members are adjustable to vary the spacing between said outer casing and said jacket.

3. Conduit construction as defined in claim 1, and wherein the metallic jacket surrounding said ceramic sections is formed at one end thereof with an enlarged mortar-receiving socket for the reception of an end of a next adjacent ceramic section, whereby to unite and seal the joints formed between said ceramic sections.

4. In a chimney, a plurality of axially aligned, interfitting preformed sections, each of said sections comprising an outer tubular metallic casing formed at each end thereof for telescopic engagement with an end of a next axially aligned section; a tubular ceramic conduit positioned within said outer casing in spaced substantially concentric relation thereto and having at least one end thereof terminating a distance inwardly from the corresponding end of said casing; an inner tubular metallic jacket disposed directly about the outer surface of said conduit and having an end portion thereon extending longitudinally beyond an end of said conduit and being relatively enlarged to provide a socket for the reception of an end portion of the ceramic conduit and inner jacket of a next longitudinally aligned section; clamping means tightly securing said jacket about said conduit to prevent relative axial movement therebetween; and connector means extending between said inner jacket and said outer casing for holding said jacket and ceramic conduit in substantially uniformly spaced concentric position within said outer casing.

5. Chimney construction as defined in claim 4, wherein said connector means is adjustable to permit said jacket and ceramic conduit of each section to be brought into substantially exact longitudinal alignment with the jacket and conduit components of a next axially aligned section at the time of uniting said sections.

6. In coaxial conduit construction, a prefabricated unit comprising an inner tubular conduit of refractory ceramic material having a substantial wall thickness; a sheet metal jacket carried on the outer surface of said inner conduit and enclosing the latter throughout at least a major portion of its length; an outer tubular metallic casing disposed in concentric spaced relation to said inner conduit and said jacket and defining with the latter a passage of annular cross section for the passage of a fluid medium through said unit and around said inner conduit and said jacket; and a plurality of relatively spaced connectors extending between said outer casing and said jacket for supporting said jacket and said inner conduit in concentrically spaced relation within said outer casing, said outer casing at one end thereof being arranged to telescope with an end of an adjoining identical unit, and said jacket at one end thereof being formed with a diametrically enlarged flange extending axially beyond said inner conduit to telescopingly receive the opposite end portion of the inner conduit and jacket of an identical adjoining unit, said inner conduit being arranged for abutting, end to end engagement with the inner conduit member of an identical adjoining unit upon assembly of a plurality of such units into coaxial conduit of substantial length.

7. In coaxial conduit construction; a prefabricated unit comprising an inner tubular conduit of refractory ceramic material having a substantial wall thickness; a sheet metal jacket carried on the outer surface of said inner conduit and enclosing the latter throughout at least a major portion of its length, said inner conduit at one end thereof extending axially outwardly from said jacket to be telescopingly received within the jacket of an identical adjoining unit; an outer tubular metallic casing disposed in concentric spaced relation to said inner conduit and said jacket and defining with the latter a passage of annular cross section for the passage of a fluid medium through said unit and around said inner conduit and said jacket; and a plurality of relatively spaced connectors extending between said outer casing and said jacket for supporting said jacket and said inner conduit in concentrically spaced relation within said outer casing, said outer casing and said jacket at one end thereof being arranged to telescope with an end of an adjoining identical unit, and said inner conduit being arranged for abutting, end to end engagement with the inner conduit member of an identical adjoining unit upon assembly of a plurality of such units into coaxial conduit of substantial length.

References Cited in the file of this patent

UNITED STATES PATENTS

| | | |
|---|---|---|
| 249,308 | Clawson | Nov. 8, 1881 |
| 1,578,734 | Hume | Mar. 30, 1926 |
| 2,277,436 | Howle | Mar. 24, 1942 |
| 2,512,116 | Siebels | June 20, 1950 |
| 2,658,527 | Kaisar | Nov. 10, 1953 |